United States Patent
Pak

(10) Patent No.: US 7,763,797 B2
(45) Date of Patent: Jul. 27, 2010

(54) CEILING-MOUNTED WIRELESS NETWORK ACCESS POINT

(75) Inventor: Victor S. Pak, San Mateo, CA (US)

(73) Assignee: Pakedge Device & Software Inc., Menlo Park, CA (US)

( * ) Notice: Subject to any disclaimer, the term of this patent is extended or adjusted under 35 U.S.C. 154(b) by 1528 days.

(21) Appl. No.: 11/085,742

(22) Filed: Mar. 21, 2005

(65) Prior Publication Data

US 2006/0211451 A1    Sep. 21, 2006

Related U.S. Application Data

(60) Provisional application No. 60/555,064, filed on Mar. 22, 2004.

(51) Int. Cl.
*H02G 3/18* (2006.01)
*H01Q 1/42* (2006.01)

(52) U.S. Cl. .............................. 174/60; 174/63; 343/872

(58) Field of Classification Search .................... 174/43, 174/40 CC, 60, 520, 560; 343/872
See application file for complete search history.

(56) References Cited

U.S. PATENT DOCUMENTS

| | | | | |
|---|---|---|---|---|
| 5,619,217 A * | 4/1997 | Mailandt et al. | ............. | 343/872 |
| 5,939,670 A * | 8/1999 | Shteynberg et al. | ......... | 174/481 |
| 6,005,195 A * | 12/1999 | Kam | ........................... | 174/135 |
| 6,291,767 B1 * | 9/2001 | Beecher et al. | ............... | 174/50 |
| 6,337,438 B1 * | 1/2002 | Oyamada | ..................... | 174/535 |
| 6,563,465 B2 * | 5/2003 | Frecska | ............... | 343/700 MS |
| 6,727,429 B1 * | 4/2004 | Koessler | ...................... | 174/50 |
| 6,933,909 B2 * | 8/2005 | Theobold | ..................... | 343/893 |
| 7,049,512 B1 * | 5/2006 | Chung et al. | ................... | 174/58 |
| 7,129,411 B2 * | 10/2006 | Bump et al. | ................... | 174/58 |
| 7,173,185 B1 * | 2/2007 | Cloran et al. | ................. | 174/58 |
| 7,355,118 B1 * | 4/2008 | Gretz | ........................... | 174/58 |
| 2002/0050955 A1 * | 5/2002 | Strickland et al. | ........... | 343/895 |

* cited by examiner

*Primary Examiner*—Hung V Ngo
(74) *Attorney, Agent, or Firm*—Foley & Lardner LLP

(57) ABSTRACT

A ceiling-mountable wireless access point includes a ceiling box with a wing bracket and a wireless access point. The access point is receivable in the ceiling box, with the ceiling box mountable in a drywall installation. The wing bracket couples with ceiling box to secure the apparatus in a ceiling. A power-over-Ethernet module may be provided to eliminate the need for a dedicated power supply at the installation site.

19 Claims, 12 Drawing Sheets

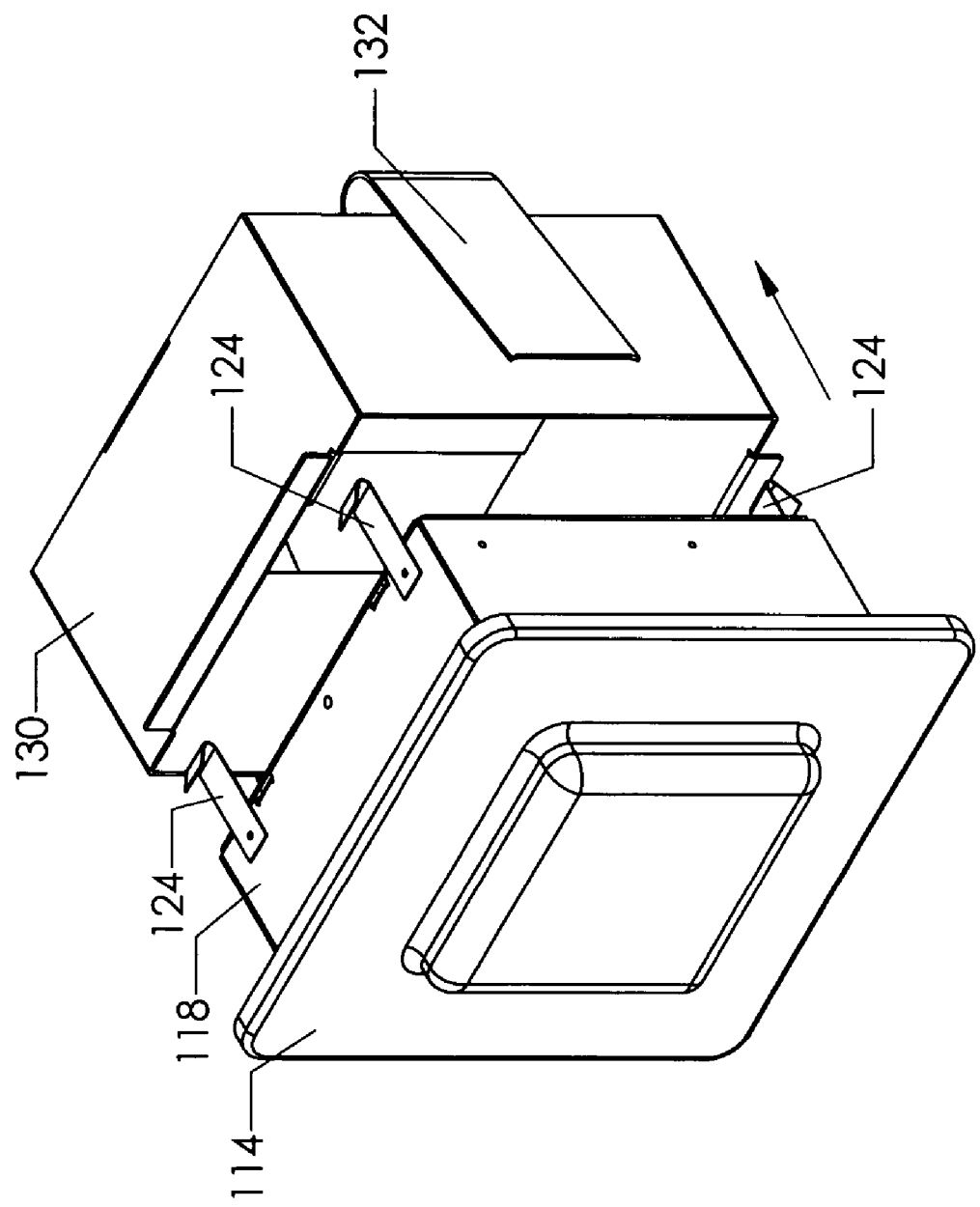

CEILING-MOUNTED WIRELESS NETWORK ACCESS POINT

BACKGROUND OF THE INVENTION

The present invention relates to wireless networks and, more particularly, to ceiling-mounted wireless access points.

With the advances in wireless technology, wireless networking is becoming increasingly common, not only in the workplace but also in homes. A wireless network typically includes a wireless router and one or more devices such personal computers and portable data assistants (PDAs) each with a wireless modem. The router is best placed in a central location so as to maximize efficient wireless communication with each of the devices in the network. However, wireless signals, which consist of radio-frequency (RF) signals, do not readily pass through certain materials, such liquids and metals.

To enhance the wireless communication and minimize obstruction of the wireless signals from interfering material, the router is often positioned at an elevated location, such as on a bookcase or on the ceiling. While a conventional flat-surface router mounted on the ceiling may satisfy certain business needs, a homeowner with an eye toward the aesthetic will not find such a solution palatable.

In view of the foregoing, there remains a need in the art for a wireless access point with enhanced ceiling-mountable qualities.

SUMMARY OF THE INVENTION

According to one aspect of the invention, apparatus for mounting a wireless access point in drywall, such as in a ceiling includes a ceiling box and a wing bracket. The ceiling box may include an inner chamber with an opening for receiving the wireless access point, a brace extending across an end of the inner chamber opposite to the opening and having a threaded through hole, and a pair of flanges extending outwardly from the opening. The wing bracket may include a cross member with a threaded through hole and a pair of arms resiliently extending from the cross member at an outward angle. The wing bracket is fittable over the housing such that when the through holes are substantially aligned with each other and a screw is tightened therein, the cross member of the wing bracket is drawn toward the brace of the ceiling box, with the arms extending beyond the opening of the inner chamber. Accordingly, when the apparatus is mounted in a drywall environment, the flanges are received against a room-side of the drywall and ends of the arms of the wing bracket engage an interior side of the drywall.

According to another aspect of the invention, a ceiling-mountable wireless access point includes apparatus as described above and a wireless access point. When mounted, the wireless access point is received in the inner chamber of the ceiling box with a cover thereof flush against the drywall. The cover may include an antenna recess that extends slightly downwardly from the cover. In addition, a perimetrical section of the cover may extend outwardly to conceal the flanges.

One of the advantages of the invention is that one or more wireless access points may be mounted in a ceiling or another drywall location, either as a retrofit or during new construction. The cover of the wireless access point provides a clean finish to the installation. In addition, a power-over-Ethernet module may be provided so that a power supply does not need to be installed at the mounting locations.

Other features and advantages of the present invention will become apparent to those skilled in the art from a consideration of the following detailed description taken in conjunction with the accompanying drawings.

BRIEF DESCRIPTION OF THE SEVERAL VIEWS OF THE DRAWINGS

FIG. 7A illustrates a wireless access point being inserted in a ceiling-mounting apparatus;

DETAILED DESCRIPTION OF THE INVENTION

Figure 1:
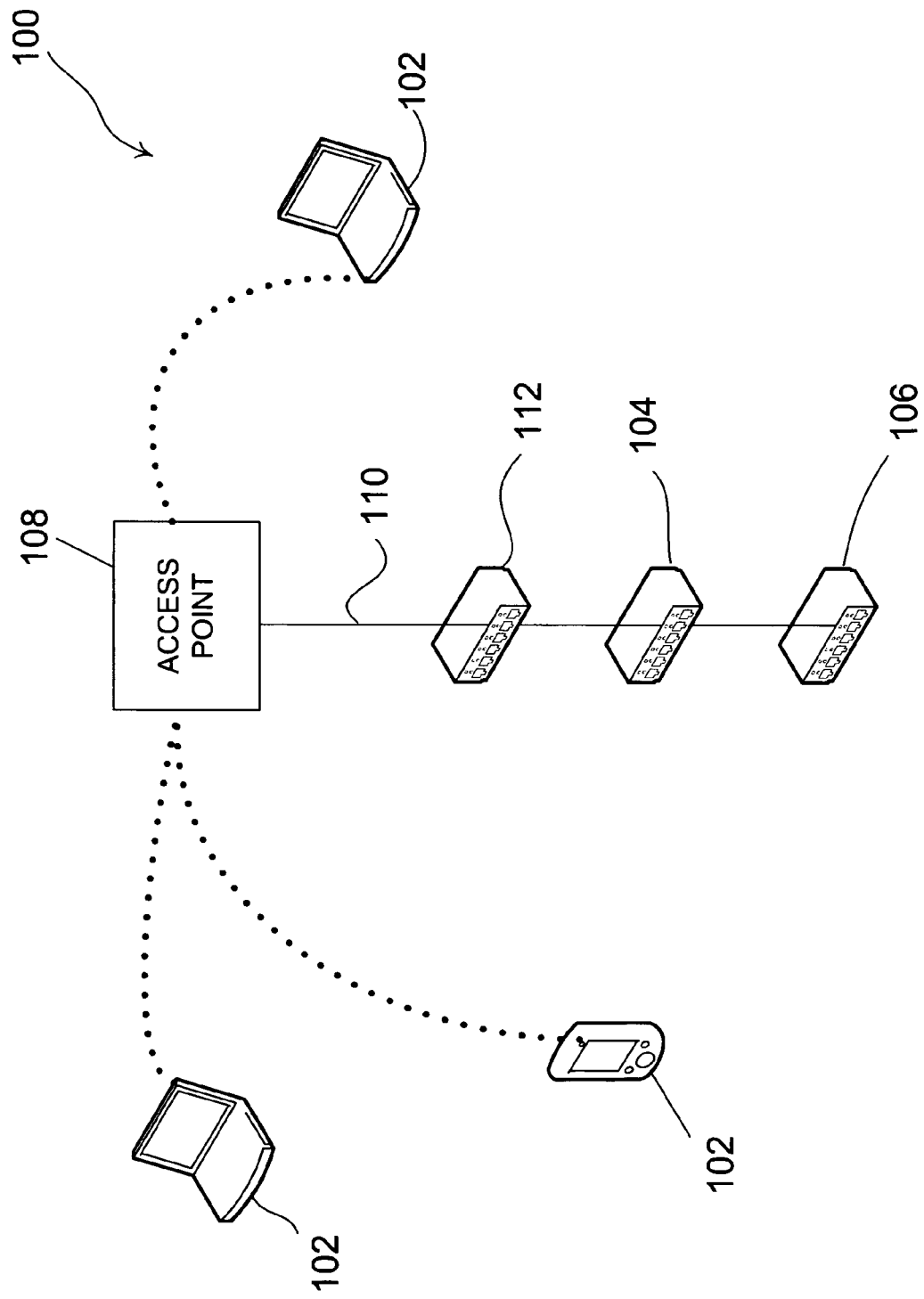
FIG. 1 illustrates a wireless network according to a number of embodiments.

Referring to the drawings in more detail, a wireless network 100 is shown in FIG. 1 to include a plurality of devices 102 such as computers and PDAs each with a wireless mode, and a router 104 connected to an external data source such as a modem 106.

According to a number of embodiments, the network 100 may also include a ceiling-mountable access point 108 connected to the router 104, for example, with Ethernet cable 110. In some of the embodiments, the network 100 may also include a power-over-Ethernet (POE) module 112 connected between the router 104 and the access point 108 to provide power to the ceiling-mountable access point 108 via the Ethernet cable 110. The POE module 112 eliminating the need for a dedicated power supply such as an electrical junction box to be located at the access point 108 in the ceiling.

Figure 2:
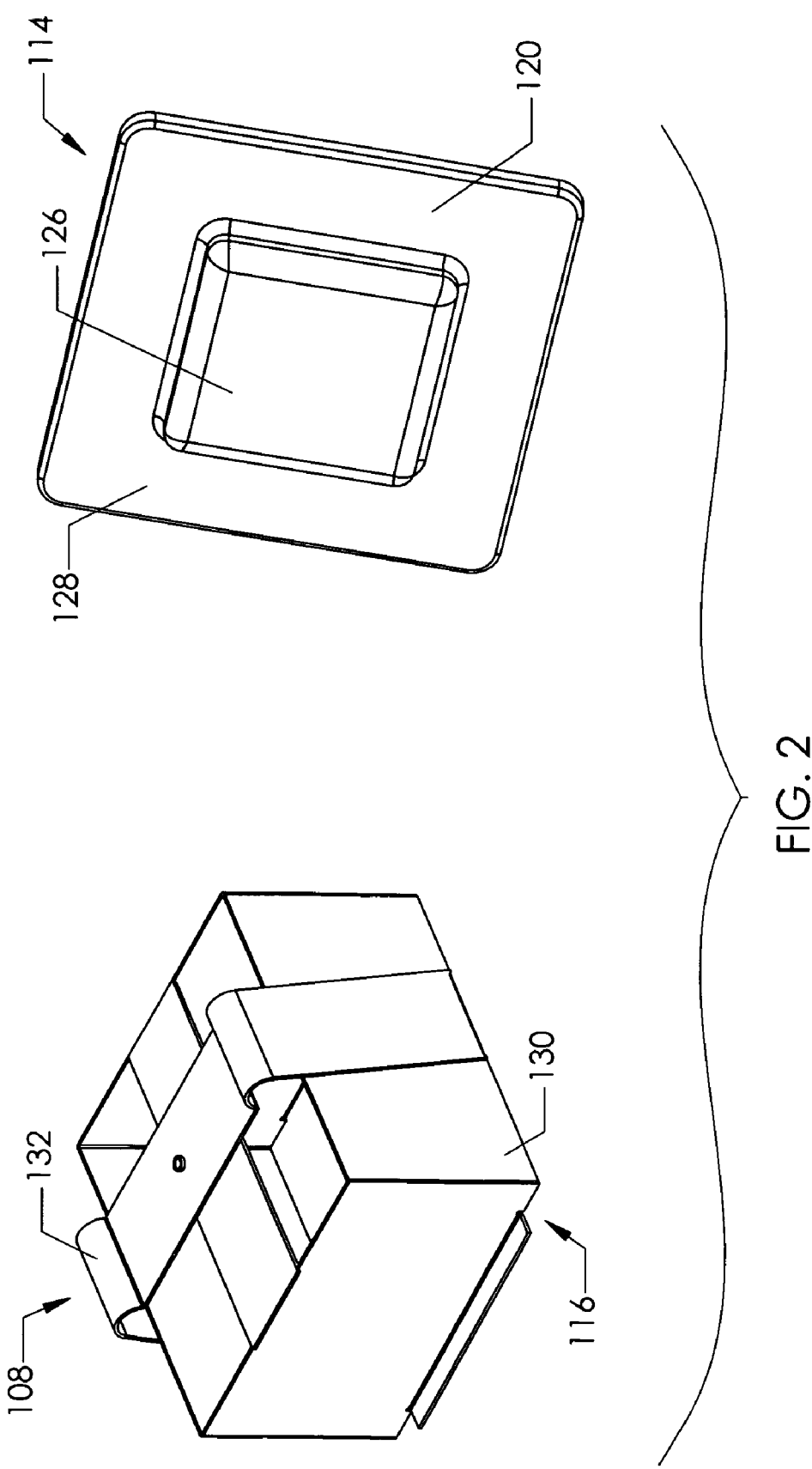
FIG. 2 illustrates a ceiling-mountable access point.
Figure 3:
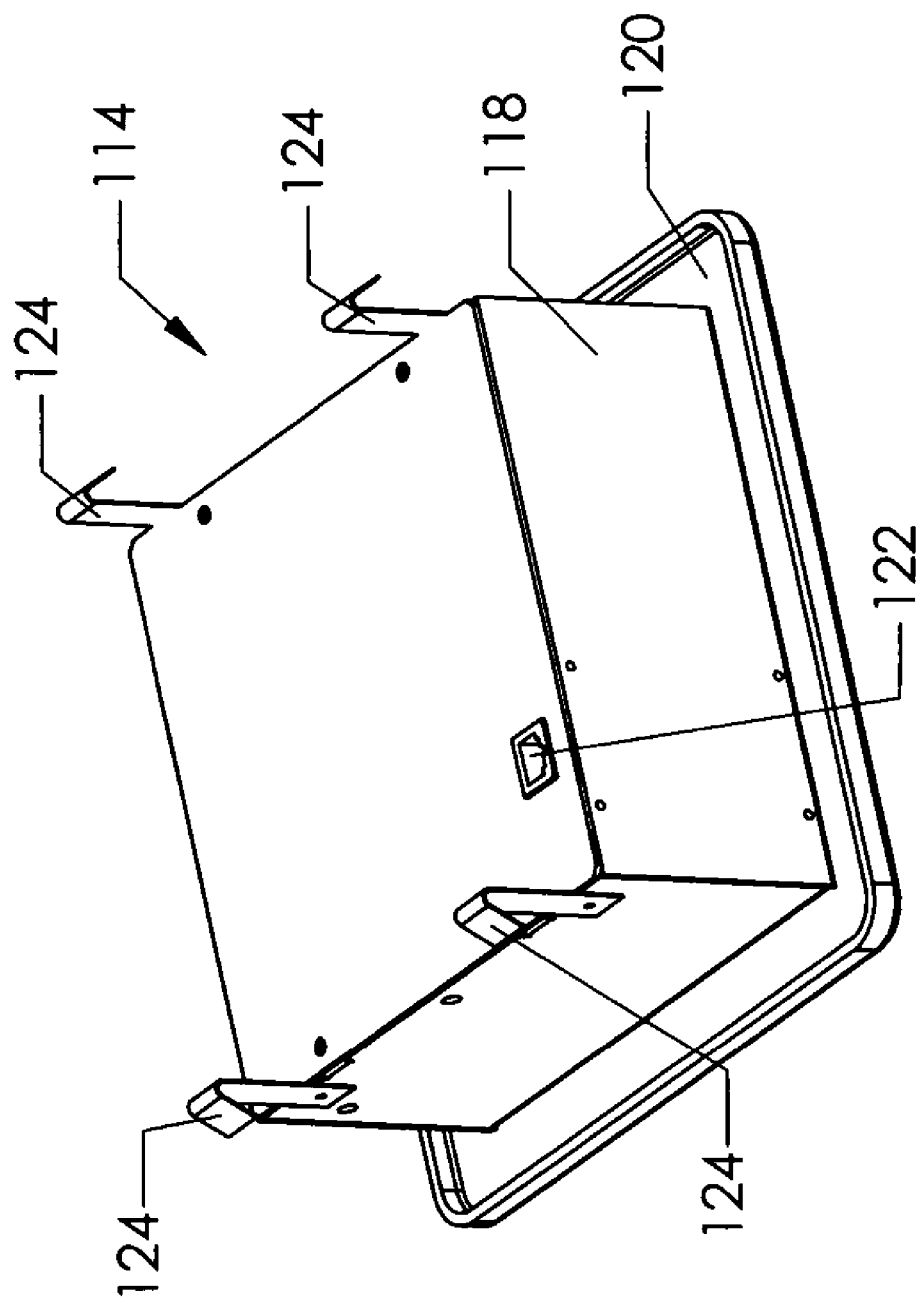
FIG. 3 is a perspective view from a bottom side of a wireless access point.

With reference to FIG. 2, the ceiling-mountable access point 108 may include a wireless access point 114 and a ceiling-mounting apparatus 116. In a number of embodiments such as shown in FIG. 3, the wireless access point 114 may include a housing 118 and a cover 120. The housing 118 includes an Ethernet jack 122 for connecting with Ethernet cable 100 from the POE module 112. The housing 118 may also include a plurality of friction springs 124 for engaging with the ceiling box 116, which is discuss in more detail below.

Figure 4:
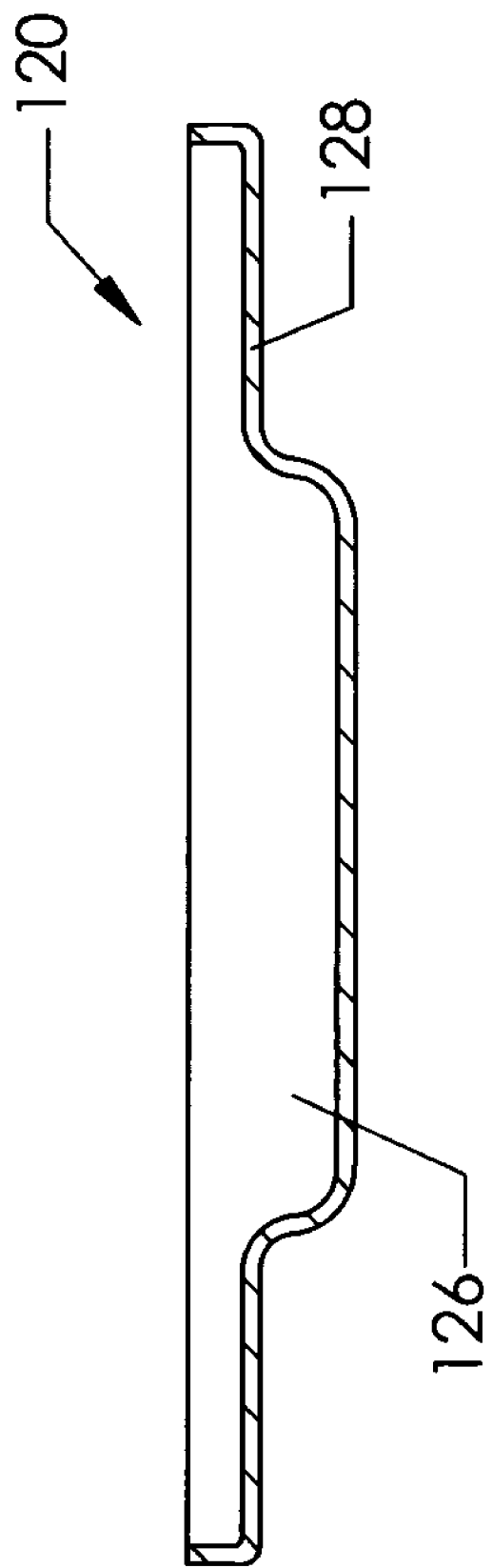
FIG. 4 is a cross-sectional view of a cover of a wireless access point.

The electrical components of the wireless access point 114 such as circuitry and an antenna are located within the housing 118 and may be configured in accordance with the art. However, according to a number of embodiments as shown in FIG. 4, the cover 120 may include an antenna recess 126 for housing an antenna of the access point 114. The antenna recess 126 may extend from a perimetrical section of the cover 120 by a few millimeters to a number of centimeters.

Figure 6:
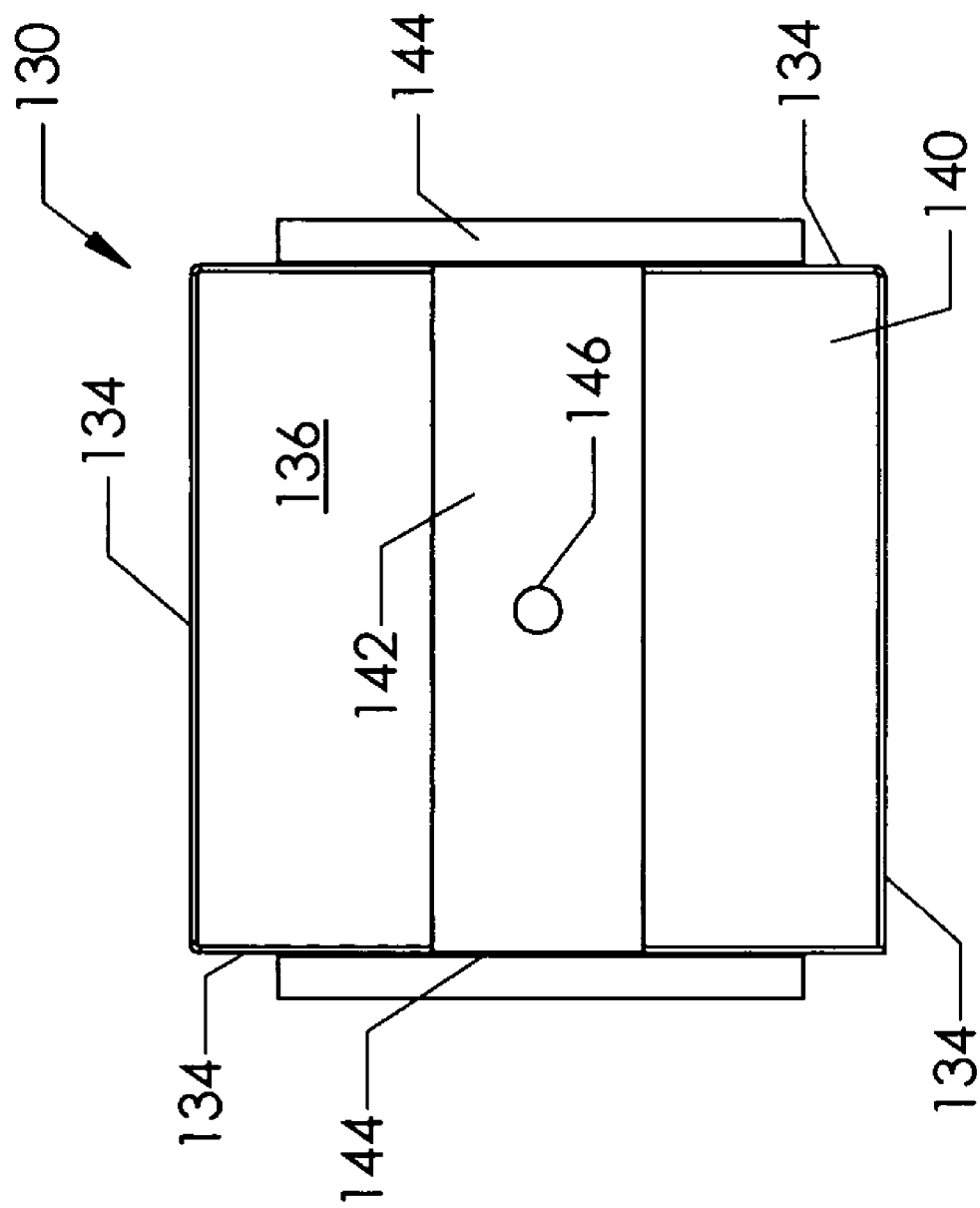
FIG. 6 is a view of the ceiling box taken from an interior side.
Figure 7B:
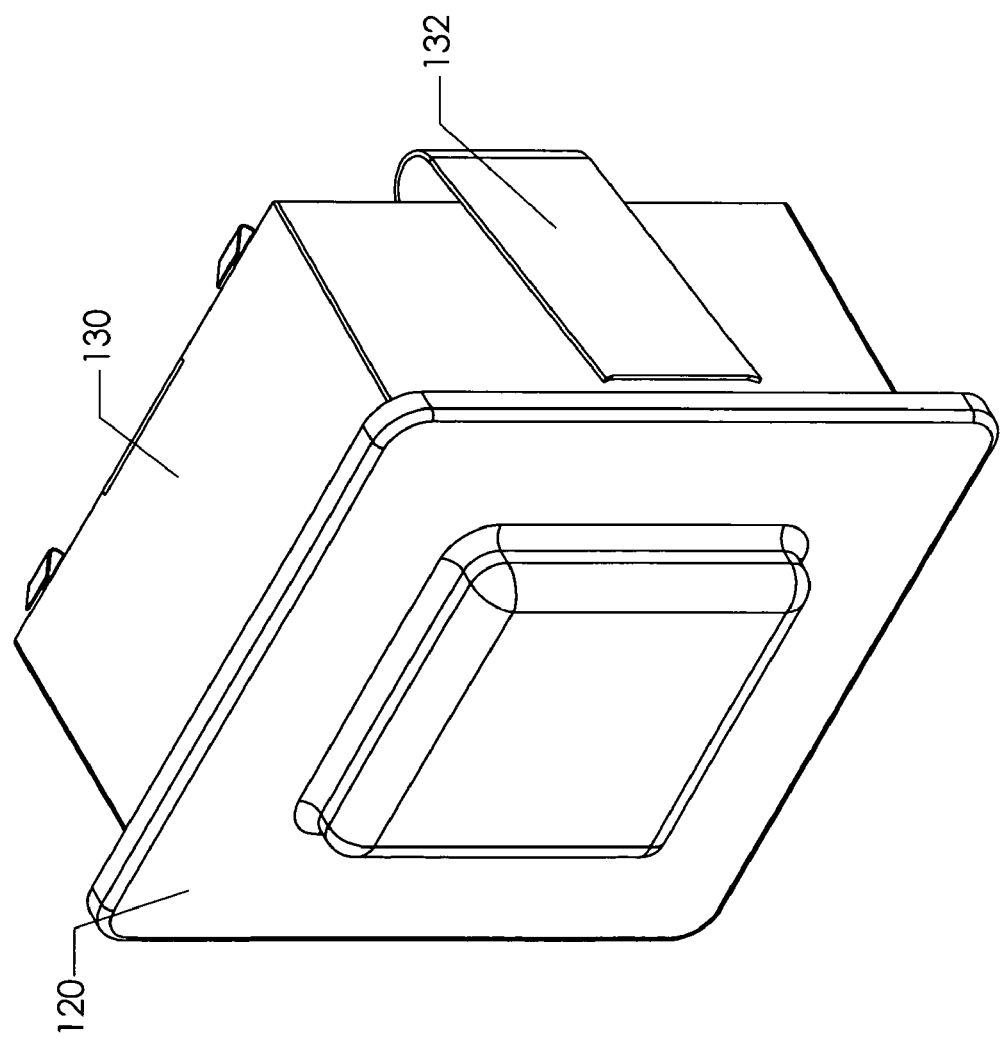
FIG. 7B illustrates the wireless access point received within the ceiling-mounting apparatus.

Also shown in FIG. 2, in a number of embodiments, the ceiling-mounting apparatus 116 may include a ceiling box 130 and a wing bracket 132. In the embodiment shown in FIGS. 5 and 6, the ceiling box 130 may include a plurality of side walls 134, such as four as shown, that define an inner chamber 136 that may be described as having an exterior opening 138 and an interior opening 140. The ceiling box 130 is configured so that the housing 118 of the access point 114 is receivable through the exterior opening 138 therein, as shown in FIGS. 7A and 7B. The friction springs 124 engage with the side walls 134 of the box 130 to retain the housing 118 therein.

Figure 5:
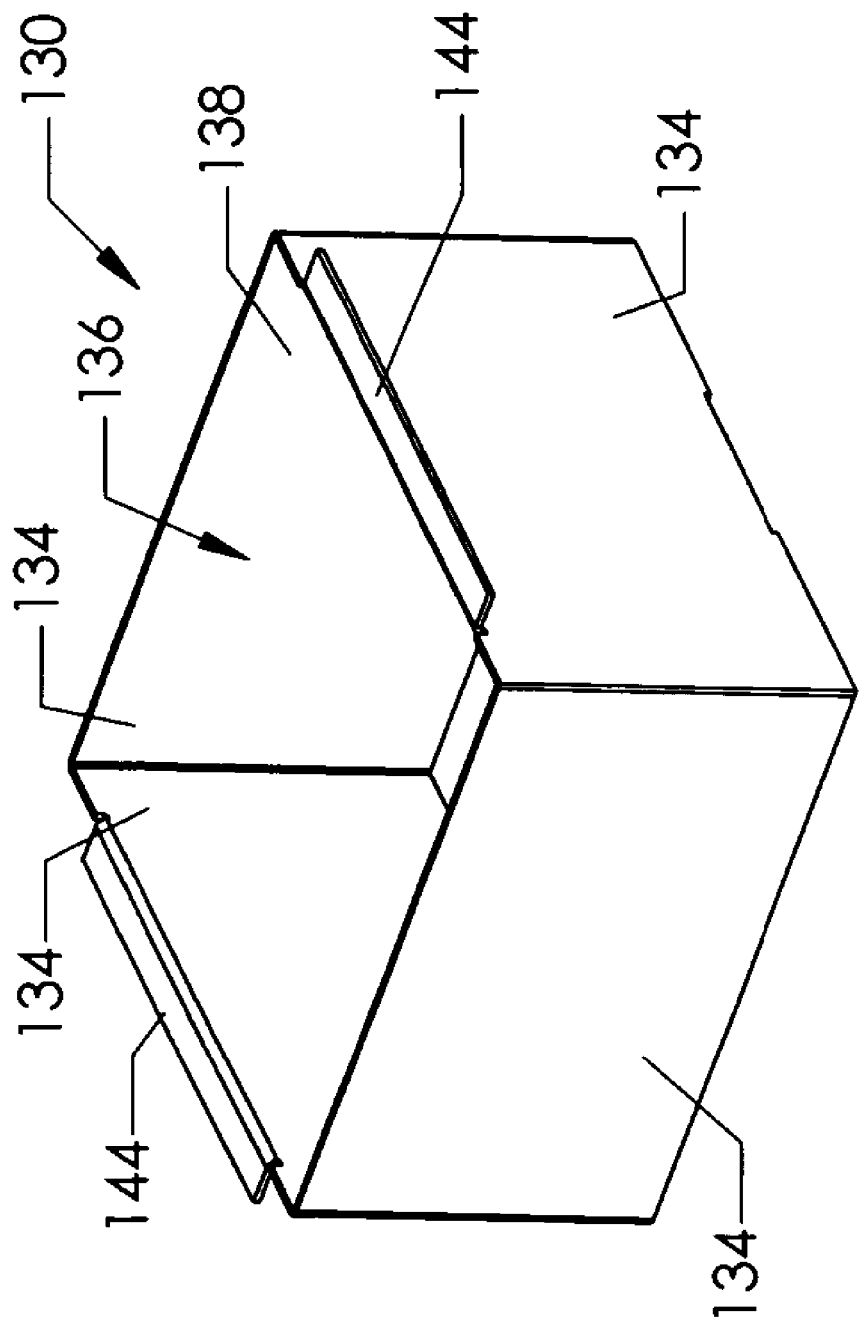
FIG. 5 is a perspective view of a ceiling box of a ceiling-mounting apparatus.

In other embodiments, the ceiling box 130 may include a brace 142 and a plurality of flanges 144. As shown in FIG. 6, in embodiments with four side walls, the brace 142 may be disposed between opposing side walls 134, thereby extending across the interior opening 140. The brace 142 may also include a threaded through hole 146. As shown in FIGS. 5 and 6, in embodiments with two flanges 144, the flanges 144 may be disposed at the exterior opening 138 at opposing side walls 134 and may extend substantially orthogonally outwardly from the side walls 134. The brace 142 and the flanges 144 are discussed in more detail below.

Figure 8:
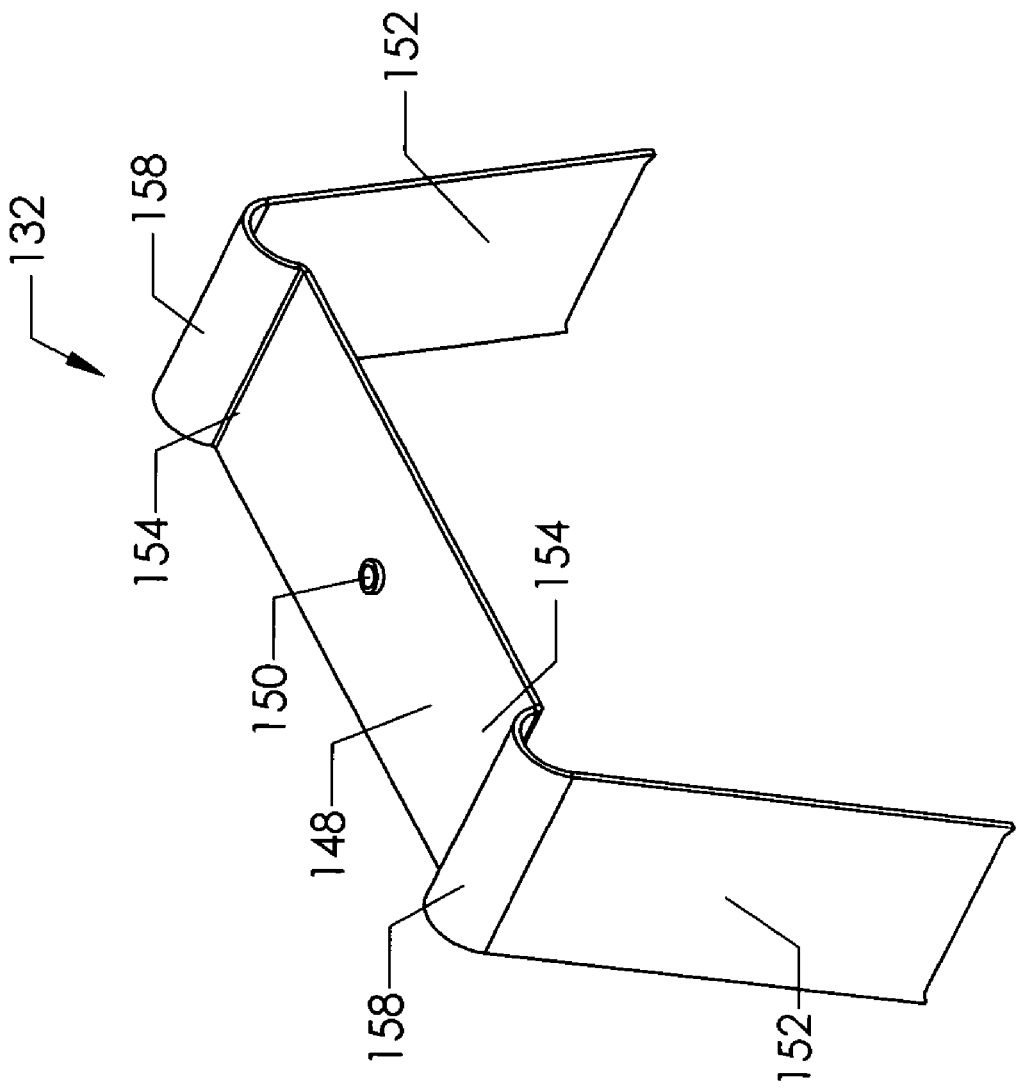
FIG. 8 is a perspective view of a wing bracket of a ceiling-mounting apparatus.
Figure 9:
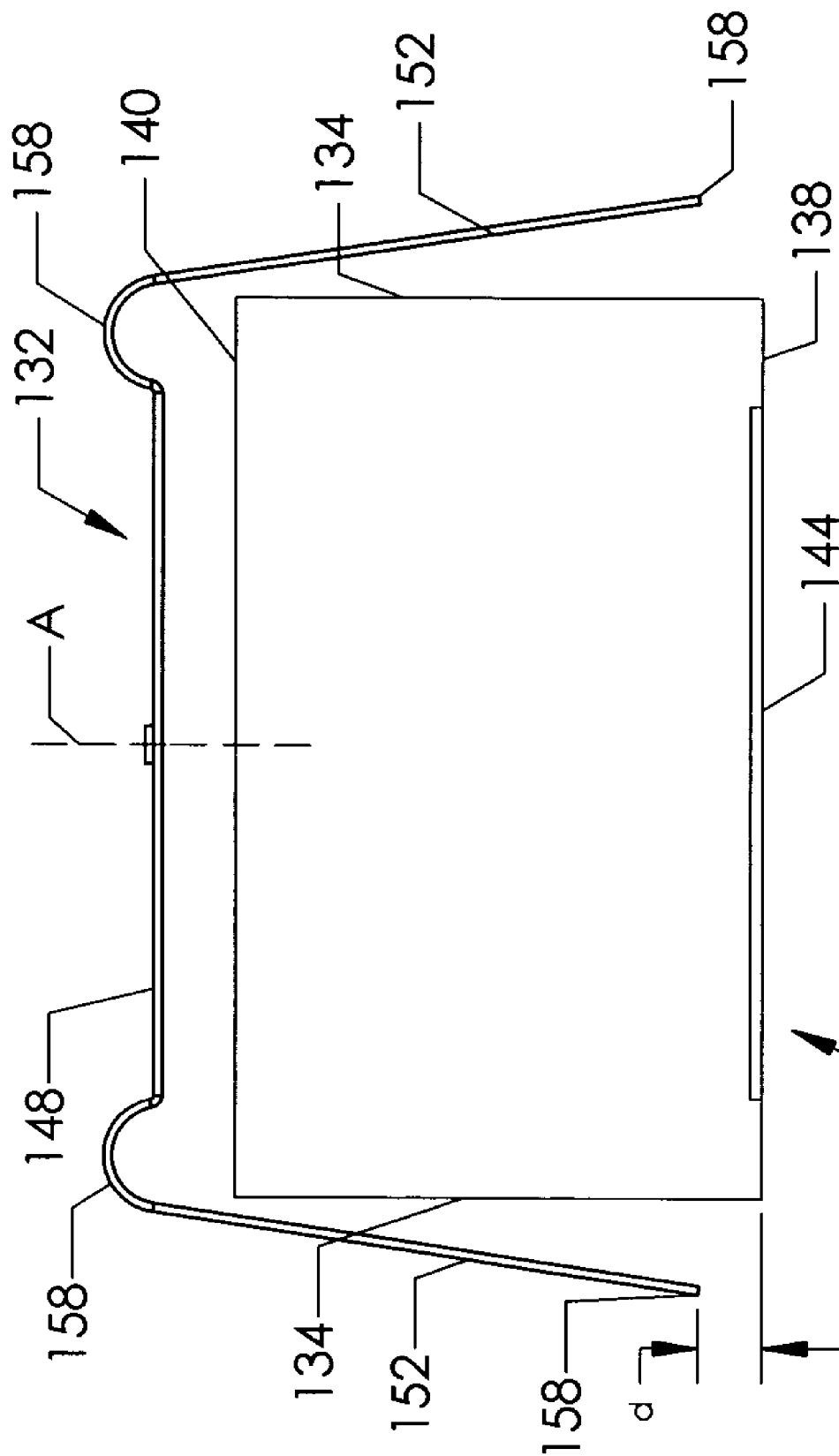
FIG. 9 is a side view of the wing bracket mounted to the ceiling box.
Figure 10:
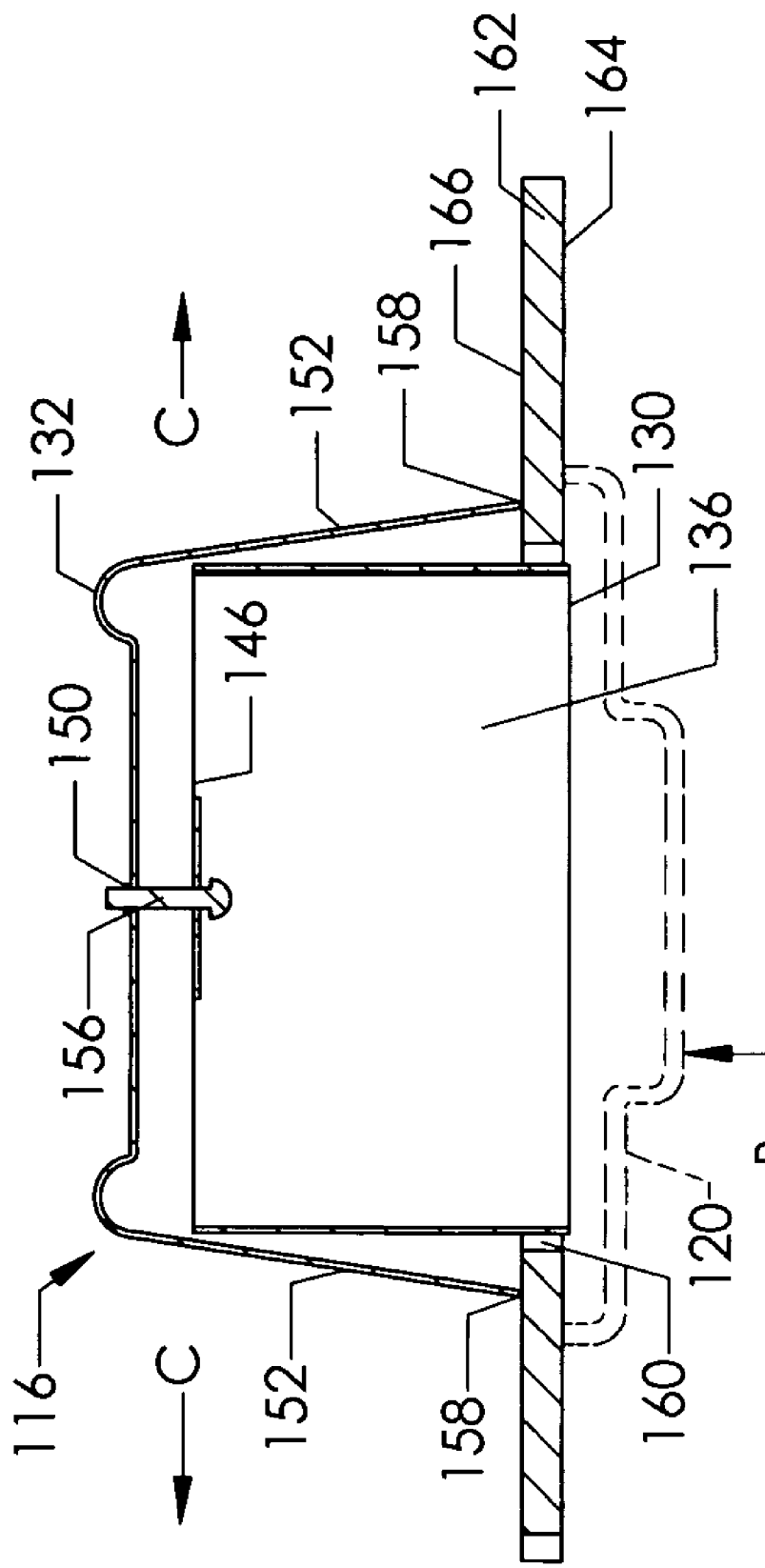
FIG. 10 is a cross-sectional view of the ceiling-mounting apparatus received in an opening in drywall.

In the embodiment shown in FIG. 8, the wing bracket 132 may include a cross member 148 with a threaded through hole 150 and a pair of arms 152 resiliently extending from ends 154 of the cross member 148 at an outward angle, which is particularly shown in FIG. 9. As also shown in the embodiment in FIG. 9, the arms 152 may have a greater length than the side walls 134 have between the openings 138 and 140. Accordingly, the wing bracket 132 is fittable, mountable, or positionable over the ceiling box 130 such that when the through holes 146 and 150 are substantially aligned with each other and a screw 156 is tightened therein as represented by axis A in FIG. 9 and as shown in FIG. 10, the arms 152 are extend toward the exterior opening 138 over opposing side walls 134 and ends 158 of the arms 152 can extend beyond the exterior opening 138, e.g., by a distance d. In addition, when the screw 156 is tightened, the wing bracket 132 is drawn toward the ceiling box 130, which is discussed below. As shown in FIGS. 8 and 9, each of the arms 152 of the wing bracket 132 may include a curved portion 158 disposed at the connection or intersection with the cross member 148 to enhance the outward and inward resiliency of the arms 152.

To install the ceiling-mounting apparatus 116 in a drywall-type ceiling as shown in FIG. 10, the wing bracket 132 may be mounted to the ceiling box 130 as shown in FIGS. 2 and 9, with the screw 156 loosened as much as possible so that the wing bracket 132 is not drawn toward the box 130 and the arms 152 are positioned away from the exterior opening 138 (i.e., toward the interior opening 140). An opening 160 may then be cut in a sheet of drywall 162 about the size and dimensions of the ceiling box 130. The coupled ceiling box 130 and wing bracket 132 may then be inserted through the opening 160 in the drywall 162 as shown by arrow B to a point at which the arms 152 completely pass through the opening 160, at which point the arms 152 spring outwardly as shown by arrow C. The screw 156 may then be tightened to draw the box 130 upwardly to the point at which the flanges 144 contact a room side 164 of the drywall and the ends 158 of the arms 152 engage an interior side 166 of the drywall 162, thereby securing the apparatus 116 in the opening 160.

Figure 11:
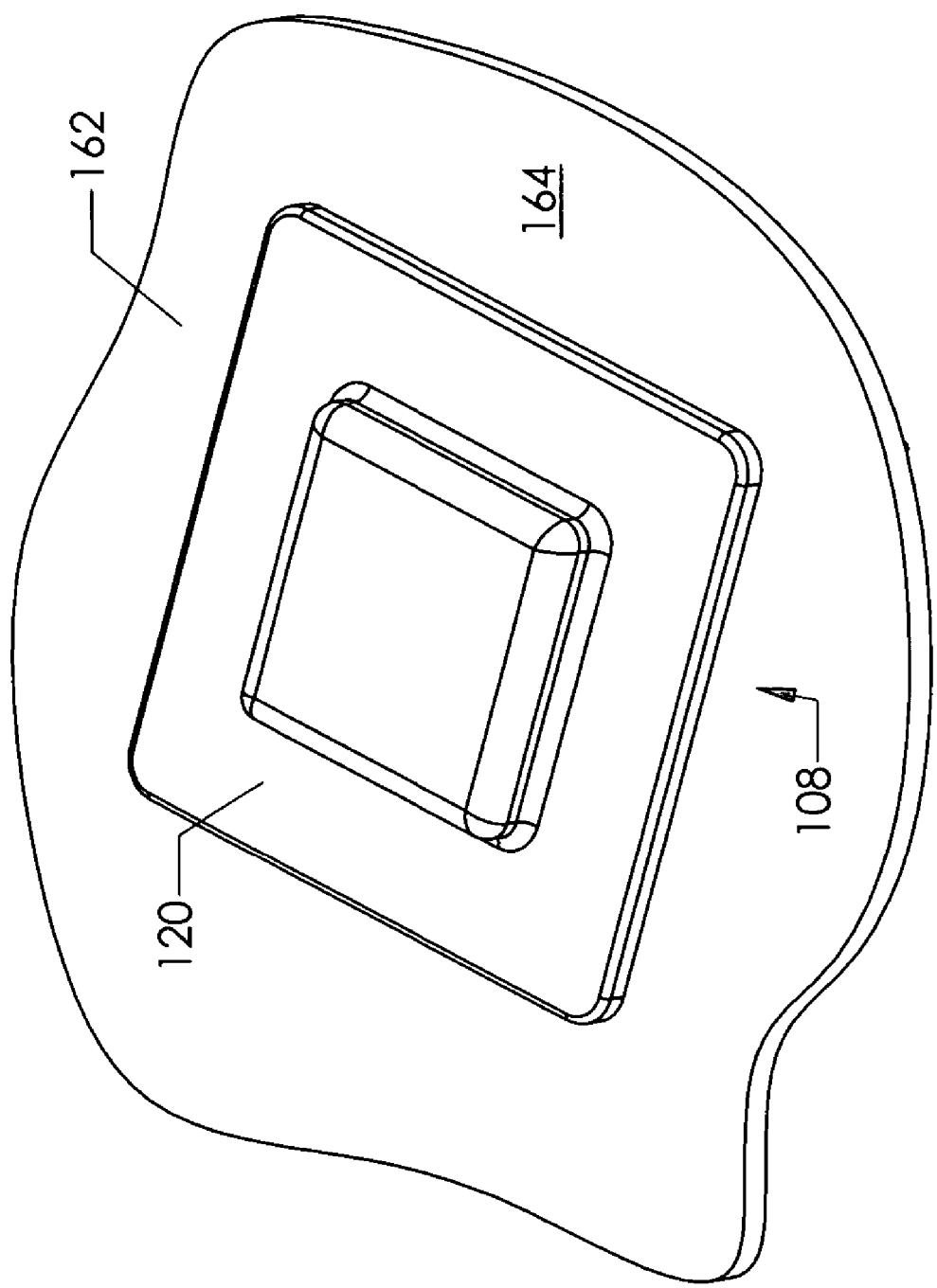
FIG. 11 is a perspective view of a ceiling-mounted wireless access point.

The wireless access point 114 may then be inserted into the inner chamber 136 as described above, thereby resulting in a ceiling-mounted access point 108 as shown in FIG. 11. As shown in phantom line in FIG. 10, the cover 120 may extend outwardly from the housing 118 such that when the housing 118 is received in the inner chamber 136, the cover 120 extends beyond the flanges 144 of the ceiling box 130, thereby providing a clean finish.

Those skilled in the art will understand that the preceding exemplary embodiments of the present invention provide the foundation for numerous alternatives and modifications thereto. For example, in addition to ceilings, the apparatus 108 may be mounted within walls or any other structure with similar planar building material like drywall or plywood. In addition, the ceiling box 130 have may any number of sides, with the housing 118 of the access point 114 being complementarily configured. These and other modifications are also within the scope of the present invention. Accordingly, the present invention is not limited to that precisely as shown and described above but by the scope of the appended claims.

What is claimed is:

1. A ceiling-mounted wireless access point comprising:
a ceiling box including:
a plurality of side walls defining an interior opening, an exterior opening, and an inner chamber;
a brace disposed between the side walls and extending across the interior opening and including a threaded through hole; and
a plurality of flanges disposed at the exterior opening and extending orthogonally outwardly from the side walls;
a wing bracket including:
a cross member with a threaded through hole; and
a pair of arms resiliently extending from ends of the cross member at an outward angle;
the arms having a greater length than the side walls have between the openings;
the wing bracket being fittable over the ceiling box such that when the through holes are substantially aligned with each other and a screw is tightened therein, the arms extend toward the exterior opening and the wing bracket is drawn toward the ceiling box; and
a wireless access point including a housing that is receivable through the exterior opening and within the inner chamber;
the housing including a plurality of friction springs that are adapted to engage with the side walls of the ceiling box to secure the access point within the ceiling box.

2. The ceiling-mounted wireless access point of claim 1 further comprising a power-over-Ethernet module for connection with the access point.

3. The ceiling-mounted wireless access point of claim 1 wherein each of the arms of the wing bracket includes a curved portion disposed at the connection with the cross member.

4. The ceiling-mounted wireless access point of claim 1 wherein the access point includes a cover that extends outwardly from the housing such that when the housing is received in the inner chamber, the cover extends beyond the flanges of the ceiling box.

5. The ceiling-mounted wireless access point of claim 1 wherein the ceiling box includes a pair of the flanges.

6. The ceiling-mounted wireless access point of claim 1 wherein the ceiling box includes four of the side walls.

7. The ceiling-mounted wireless access point of claim 1 wherein the housing includes a perimetrical section and an antenna recess extending outwardly from the perimetrical section.

8. Apparatus for mounting a wireless access point in drywall, the apparatus comprising:
a box including:
an inner chamber with an opening for receiving the wireless access point;

a brace extending across an end of the inner chamber opposite to the opening and having a threaded through hole; and a plurality of flanges extending outwardly from the opening;

a wing bracket including:

a cross member with a threaded through hole; and a pair of arms resiliently extending from the cross member at an outward angle;

the wing bracket being fittable over the housing such that when the through holes are substantially aligned with each other and a screw is tightened therein, the cross member of the wing bracket is drawn toward the brace of the box, with the arms extending beyond the opening of the inner chamber.

9. The apparatus of claim 8 wherein when mounted in drywall, the flanges are received against a room-side of the drywall and ends of the arms of the wing bracket engage an interior side of the drywall.

10. The apparatus of claim 8 wherein each of the arms of the wing bracket includes a curved portion disposed at the connection with the cross member.

11. The ceiling-mounted wireless access point of claim 8 wherein the housing includes a perimetrical section and an antenna recess extending outwardly from the perimetrical section.

12. A wireless access point comprising:

a mounting apparatus comprising a flange, disposed at an exterior opening of the mounting apparatus, for engaging an outward surface of a building material that has an outward surface and an inward surface;

at least a first member coupled to the mounting apparatus and adjustable with respect to the mounting apparatus so as to engage the inward surface of the building material; and a housing connected to a wireless router, the housing being received by the mounting apparatus through the exterior opening and engaging the mounting apparatus to secure the housing to the mounting apparatus.

13. The wireless access point claimed in claim 12, further comprising a power-over-Ethernet module connected to the housing that is connected to the wireless router.

14. The wireless access point claimed in claim 12, wherein the first member is adjustable with respect to the mounting apparatus by tightening a screw that passes through the mounting apparatus and engages the first member.

15. The wireless access point claimed in claim 12, further comprising a cover that extends outwardly from the mounting apparatus.

16. The wireless access point claimed in claim 15, wherein the cover extends beyond the flange of the mounting apparatus to cover the flange.

17. The wireless access point claimed in claim 12, wherein the mounting apparatus comprises a box having said flange at an exterior opening of the box.

18. The wireless access point claimed in claim 17, wherein:

the box further comprises a brace spanning an interior opening of the box, the brace having a through hole; and wherein the first member comprises a wing bracket including a cross member having a threaded through hole and a pair of arms extending from ends of the cross member at an outward angle, the wing bracket being adjustable with respect to the box by the tightening of a screw within the through holes of the brace and the wing bracket.

19. The wireless access point claimed in claim 12, wherein the housing comprises a plurality of friction springs that are adapted to engage the mounting apparatus.

\* \* \* \* \*